United States Patent
Zhang et al.

(10) Patent No.: US 10,928,562 B2
(45) Date of Patent: Feb. 23, 2021

(54) OPTICAL FILM ELEMENT, BACKLIGHT, AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Shubai Zhang, Beijing (CN); Pengfei Cheng, Beijing (CN); Haiwei Sun, Beijing (CN); Junjie Ma, Beijing (CN); Yutao Hao, Beijing (CN); Yuanda Lu, Beijing (CN); Zhen Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 137 days.

(21) Appl. No.: 16/241,394

(22) Filed: Jan. 7, 2019

(65) Prior Publication Data
US 2019/0346594 A1    Nov. 14, 2019

(30) Foreign Application Priority Data
May 8, 2018    (CN) .......................... 201810431300.3

(51) Int. Cl.
*G02B 5/02*     (2006.01)
*G02B 5/04*     (2006.01)
(Continued)

(52) U.S. Cl.
CPC ......... *G02B 5/0226* (2013.01); *G02B 5/0278* (2013.01); *G02B 5/045* (2013.01);
(Continued)

(58) Field of Classification Search
CPC ...... G02B 6/0025; G02B 5/02; G02B 5/0278; G02B 5/045; G02B 6/0053; G02B 27/0961; G02B 30/27; G02B 3/0043; G02B 3/005; G02B 5/0221; G02B 5/0226; G02B 6/0046; G02B 6/0051; G02B 6/0026; G02B 6/0023; G02B 6/005; G02B 6/0055; G02F 1/133606; G02F 1/133504;
(Continued)

(56) References Cited

U.S. PATENT DOCUMENTS 6,414,735 B1 * 7/2002 Kim .................. G02F 1/133504
349/112
6,417,966 B1 * 7/2002 Moshrefzadeh ....... G03B 21/62
359/453
(Continued)

*Primary Examiner* — Balram T Parbadia
(74) *Attorney, Agent, or Firm* — Nath, Goldberg & Meyer; Joshua B. Goldberg

(57) ABSTRACT

An optical film element, a backlight and a display device are disclosed. The optical film element includes a transparent base and a first diffusion film located at a first surface of the transparent base; the optical film element further includes an optical functional layer located at a second surface of the transparent base opposite to the first surface; the optical functional layer includes transmission regions and reflection regions; reflection members are provided in the reflection regions.

16 Claims, 2 Drawing Sheets

(51) Int. Cl.
*G02F 1/1335* (2006.01)
*G02F 1/13357* (2006.01)

(52) U.S. Cl.
CPC .. *G02F 1/133504* (2013.01); *G02F 1/133553* (2013.01); *G02F 1/133602* (2013.01)

(58) Field of Classification Search
CPC ......... G02F 1/133602; G02F 1/133604; G02F 1/133605; G02F 1/133615; G02F 2001/133607; G02F 1/133553; H04N 13/305
See application file for complete search history.

(56) References Cited

U.S. PATENT DOCUMENTS

| | | | | |
|---|---|---|---|---|
| 7,058,252 | B2* | 6/2006 | Woodgate | G02B 30/25 385/16 |
| 2002/0018279 | A1* | 2/2002 | Molsen | G02B 5/00 359/247 |
| 2002/0109805 | A1* | 8/2002 | Baba | G02F 1/133615 349/65 |
| 2004/0080938 | A1* | 4/2004 | Holman | G02F 1/133605 362/231 |
| 2005/0024554 | A1* | 2/2005 | Lee | G02B 6/0053 349/65 |
| 2006/0262310 | A1* | 11/2006 | Starry | B32B 5/26 356/429 |
| 2006/0285312 | A1* | 12/2006 | Ogawa | G02B 3/005 362/97.2 |
| 2007/0047254 | A1* | 3/2007 | Schardt | G02B 5/0294 362/607 |
| 2007/0236940 | A1* | 10/2007 | Kuroda | G02F 1/133606 362/339 |
| 2008/0186713 | A1* | 8/2008 | Takayama | G02B 3/005 362/297 |
| 2008/0225526 | A1* | 9/2008 | Yoshizawa | G02F 1/133611 362/294 |
| 2009/0168452 | A1* | 7/2009 | Lee | G02F 1/133615 362/608 |
| 2012/0176786 | A1* | 7/2012 | Presley | G02F 1/133611 362/225 |
| 2012/0257376 | A1* | 10/2012 | Zhou | G09F 13/04 362/97.1 |
| 2013/0077341 | A1* | 3/2013 | Kawai | G02B 6/0078 362/602 |
| 2014/0055861 | A1* | 2/2014 | Li | G03F 7/001 359/625 |
| 2016/0298828 | A1* | 10/2016 | Chang | G02F 1/133603 |

* cited by examiner

OPTICAL FILM ELEMENT, BACKLIGHT, AND DISPLAY DEVICE

CROSS-REFERENCE TO RELATED APPLICATION

The present application claims priority to Chinese Patent Application No. 201810431300.3 filed to State Intellectual Property Office of the Republic of China on May 8, 2018, titled "Optical Film Element, Backlight, and Display Device", the disclosure of which is hereby incorporated by reference in its entirety.

TECHNICAL FIELD

The present disclosure relates to the field of display technology, in particular, to an optical film element, a backlight, and a display device.

BACKGROUND

High-Dynamic Range (HDR) image allows for a larger dynamic range of brightness and more image details than a normal image. The self-illumination technology of Organic Light-Emitting Diode (OLED) provides a perfect HDR experience, but it has the disadvantages of low production yield and inability to repair dead pixels after use, making its sales and maintenance costs relatively high.

SUMMARY

The present disclosure provides an optical film element which includes a transparent base and a first diffusion film provided on a first surface of the transparent base, the optical film element further includes an optical functional layer provided on a second surface of the transparent base opposite to the first surface, wherein the optical functional layer includes a transmission region and a reflection region, and a reflection member is provided in the reflection region.

In some embodiments, a via penetrating through the first diffusion film and the transparent base is provided at a position corresponding to the transmission region.

In some embodiments, the optical film element further includes a second diffusion film provided between the optical functional layer and the transparent base.

In some embodiments, a surface of the second diffusion film away from the transparent base is of a concave-convex structure, and the reflection member is provided on the concave-convex structure.

In some embodiments, the transmission region has a width ranging from 20 μm to 1000 μm.

In some embodiments, the reflection member is made of Ag or Al.

In some embodiments, the concave-convex structure has a height difference of about 10 μm.

In some embodiments, the transparent base is made of PET plastic.

The present disclosure further provides a manufacturing method of an optical film element, including steps of: forming a first diffusion film on a first surface of a transparent base; and forming an optical functional layer on a second surface of the transparent base opposite to the first surface, wherein the optical functional layer includes a transmission region and a reflection region, and a reflection member is provided in the reflection region.

In some embodiments, a via penetrating through the transparent base and the first diffusion film is formed while forming the optical functional layer, wherein the via is provided at a position corresponding to the transmission region.

In some embodiments, the step of forming the optical functional layer and the via includes steps of: depositing an optical functional materials on the second surface of the transparent base; and perforating the optical functional materials, the transparent base and the first diffusion film at a position corresponding to the transmission region, to form the optical functional layer and the via.

In some embodiments, prior to forming the optical functional layer, the manufacturing method further includes a step of: forming a second diffusion film on the second surface of the transparent base, wherein a surface of the second diffusion film away from the transparent base is of a concave-convex structure.

In some embodiments, the step of forming the optical functional layer includes a step of: forming the reflection member on the concave-convex structure using an evaporation process.

In some embodiments, the step of forming the optical functional layer at the second surface of the transparent base opposite to the first surface further comprises steps of: depositing a reflection materials on the second surface of the transparent base using an evaporating process; and removing a portion of the reflection materials corresponding to the transmission region using a local etching process to form the optical functional layer.

The present disclosure further provides a backlight which includes: a reflective substrate, a light source provided on the reflective substrate, and the above optical film element provided at a light-exiting side of the light source, the optical functional layer of the optical film element is provided to face the light source.

The present disclosure further provides a display device which includes the above backlight.

In some embodiments, the display device further includes a wavelength conversion film and a prism film provided at a light-exiting side of the optical film element.

In some embodiments, the wavelength conversion film is a quantum dot film or a phosphor film.

Figure 1:
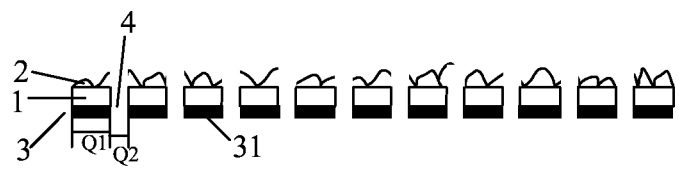
FIG. 1 is a structural diagram of a first optical film element according to an embodiment of the present disclosure.

REFERENCE NUMERALS 1. transparent base; 2. first diffusion film; 3. optical functional layer; 31. reflection member; 30. reflection materials layer; 4. via; 5. second diffusion film; 6. wavelength conversion film; 7. prism film; 10. substrate; 11. light source; Q1. reflection region; Q2. transmission region.

DETAILED DESCRIPTION

The present disclosure will be further described below with reference to specific implementations and in conjunction with the drawings in order that those skilled in the art can understand the technical solutions of the present disclosure better.

In order to realize the HDR display effect in a Liquid Crystal Display (LCD), it is necessary to use a regional illumination backlight, for example, a backlight using micro-LEDs and mini-LEDs. From the wafer processing, light board soldering process and cost considerations in the related art, mini-LEDs with large chips are employed more and more. However, the larger the chip is, the larger the light-emitting area is, the higher the central light intensity is and the more the heat being generated. Thus, it is necessary to make the distance between the chips of the mini-LEDs large, which causes the optical distance to become large. In order to achieve a uniform brightness screen, a large thickness is generally required for the display panel, which is contrary to the concept of ultra-thin display panel.

An embodiment of the present disclosure provides an optical film element and a backlight to which the optical film element is applied. As shown in FIG. 1, the optical film element includes: a transparent base 1; a first diffusion film 2 provided on a first surface of the transparent base 1; an optical functional layer 3 provided on a second surface of the transparent base 1 opposite to the first surface, wherein the optical functional layer 3 includes a plurality of transmission regions Q2 and a plurality of reflection regions Q1, and a reflection member 31 is provided in each of the reflection regions Q1.

Figure 7:
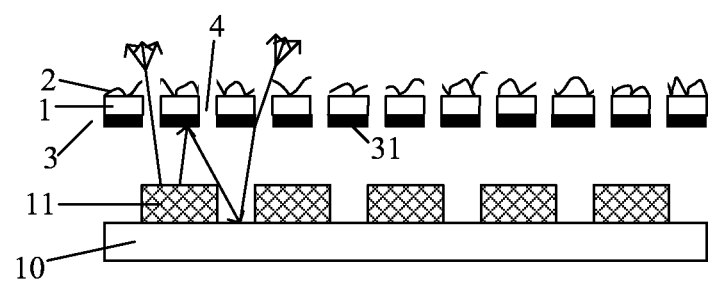
FIG. 7 is a structural diagram of a backlight according to an embodiment of the present disclosure.

The backlight typically includes a reflective substrate 10 and a plurality of light sources 11 provided on the reflective substrate, as shown in FIG. 7. The optical film element in the present embodiment is provided at a light-exiting side of the light source 11, the light emitted by the light source 11 can be irradiated to and reflected by the substrate via the reflection member 31 of the optical film element, and emitted out from the transmission region Q2 of the optical film element. The light source 11 includes mini-LEDs and/or micro-LEDs.

Since the optical film element of the present embodiment is provided at the light-exiting side of the backlight, at least part of the light emitted by the light source 11 will not be emitted out directly, but is reflected by the reflection member 31 in the optical functional layer 3 for the first time to be irradiated to the substrate 10, and then is reflected by the substrate 10 for the second time. After multiple reflections as such, almost all of the light emitted by the light sources is emitted out from the transmission regions Q2 of the optical functional layer 3, and then irradiated to the first diffusion film 2 to be homogenized. It can be seen that, with the optical film element in the present embodiment, optical path of the light emitted from the light source 11 can be increased, and a backlight with high color gamut and high dynamic contrast can be obtained. Moreover, in the backlight in the present embodiment, the optical path of the light is increased through the reflection by the optical film element, thus the backlight in this embodiment may be thinner than that in the related art.

Hereinafter, the optical film element in the present embodiment will be described in detail according to specific structures of three kinds of optical film elements described below and the manufacturing methods thereof.

In a specific implementation, as shown in FIG. 1, the optical film element includes a transparent base 1, a first diffusion film 2 provided on a first surface of the transparent base 1, and an optical functional layer 3 provided on a second surface of the optical film element opposite to the first surface, wherein a reflection member 31 is provided in each of the reflection regions Q1 of the optical functional layer 3, and vias 4 penetrating through the transparent base 1 and the first diffusion film 2 are provided at positions corresponding to the transmission regions Q2.

Figure 2:
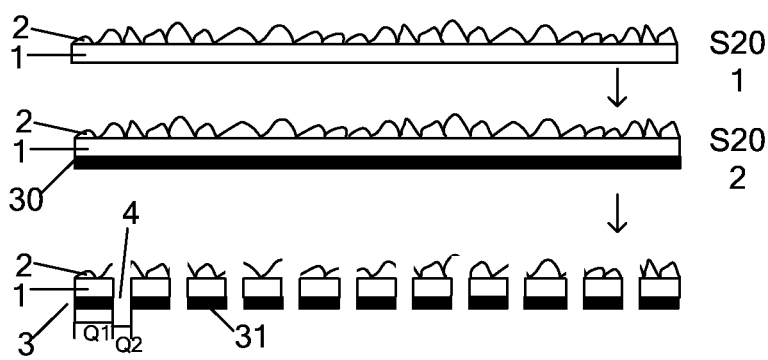
FIG. 2 is a flowchart of a manufacturing method of the first optical film element according to an embodiment of the present disclosure.

Accordingly, as shown in FIG. 2, a manufacturing method of the above optical film element is provided in the present embodiment. The manufacturing method specifically includes the following steps.

In a step S201, selecting a transparent base 1, and forming the first diffusion film 2 on the first surface of the transparent base 1, specifically, the first diffusion film 2 may be formed on a light-exiting side of the transparent base 1 by a coating method. The first diffusion film 2 has a concave-convex structure on a surface thereof away from the transparent base 1. The concave-convex structure has a large height difference which is about 10 μm. The transparent base 1 may be made of plastic such as PET or the like.

In a Step S202, forming the optical functional layer 3 on a second surface of the transparent base 1 opposite to the first surface, wherein a reflection member 31 being provided in each of the reflection regions Q1 of the optical functional layer 3; and forming vias 4 penetrating through the transparent base 1 and the first diffusion film 2 at positions corresponding to the transmission regions Q2 of the optical functional layer 3.

In the second step, the optical functional layer 3 and the vias 4 may be formed by a single patterning process.

Specifically, at first, a reflective materials layer 30 is formed on the second surface of the transparent base 1 using an evaporation process; then, the reflective materials layer 30, the transparent base 1 and the first diffusion film 2 corresponding to the transmission regions Q2 are removed by a mechanical perforation, a laser perforation or the like. In this way, the reflection members 31 (i.e., the optical functional layer) located in the reflection regions Q1 are formed, and the vias penetrating through the transparent base 1 and the first diffusion film 2 are also formed at the same time.

In order that the emitted light is dispersed better by the first diffusion film 2, and the shielding effect is improved, the dimensions of the reflection region Q1 and the transmission region Q2 of the optical functional layer 3 may be appropriately set so as to make the aperture of each of the vias 4 in the transmission regions Q2 much smaller than the radiation area of the light spot of the light source 11. For example, the dimension of the transmission area Q2 in the present embodiment is set as 20 ∞m-1000 μm. According to experimental comparison, lamp bead display effect of the backlight to which the optical film element in this embodiment is applied is significantly improved. In a case where the materials of the reflection member 31 has a reflectivity up to 95%, the optical loss is only about 10%.

The reflective materials used for the reflection member 31 in the present embodiment may be Ag (silver) or Al (aluminum) Alternatively, other materials having reflective function may be used. When materials are selected, the reflectivity may be taken into account and the materials with relatively high reflectivity is preferred.

Figure 3:
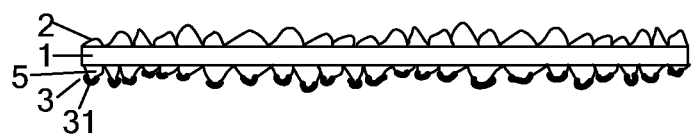
FIG. 3 is a structural diagram of a second optical film element according to an embodiment of the present disclosure.

In a specific implementation, as shown in FIG. 3, the optical film element includes a transparent base 1, a first diffusion film 2 provided on a first surface of the transparent base 1, a second diffusion film 5 provided on a second surface of the transparent base 1 opposite to the first surface, and an optical functional layer 3 provided on a surface of the second diffusion film 5 away from the transparent base 1, wherein a reflection member 31 is provided in each of reflection regions Q1 of the optical functional layer 3.

Figure 4:
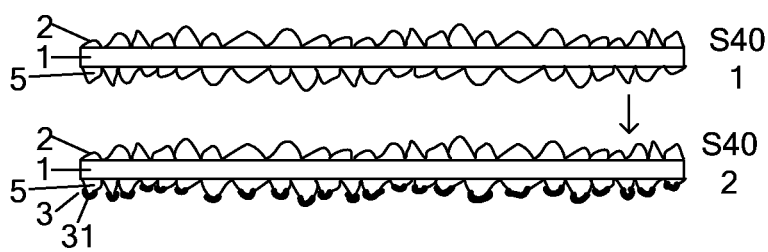
FIG. 4 is a flowchart of a manufacturing method of the second optical film element according to an embodiment of the present disclosure.

Accordingly, as shown in FIG. 4, a manufacturing method of the above optical film element is provided in the present embodiment. The method specifically includes the following steps.

In a Step S401, selecting a transparent base 1, forming a first diffusion film 2 on a first surface of the transparent base 1, and forming a second diffusion film 5 on a second surface of the transparent base 1 opposite to the first surface, wherein the first diffusion film 2 and the second diffusion film 5 may be formed on the transparent base 1 by a coating method. A surface of the first diffusion film 2 away from the transparent base 1 and a surface of the second diffusion film 5 away from the transparent base 1 each are of a concave-convex structure. The concave-convex structure has a large height difference which is about 10 μm. The transparent base 1 may be made of plastic such as PET.

In a step S402, forming an optical functional layer 3 on the surface of the second diffusion film 5 away from the transparent base 1, wherein a reflection member 31 is provided in each of the reflection regions Q1 of the optical functional layer 3.

Specifically, the step S402 may be performed as follows: an evaporation process is used, and a concentration of the materials to be evaporated and a distance between the materials to be evaporated and the second diffusion film 5 in the evaporation process are controlled so as to directly form the reflection members 31 on the second diffusion film 5. The reflection members 31 define the reflection regions Q1 of the optical functional layer 3, while portions on the second diffusion film 5 where no reflection member 31 is formed function as the transmission regions Q2. The reason why the reflection members 31 can be directly formed by the evaporation process is that the surface of the second diffusion film 5 away from the transparent base 1 is of a concave-convex structure, that is, the surface of the second diffusion film 5 away from the transparent base 1 has height differences. Therefore, during the evaporation process, the evaporated reflective materials may be naturally cracked off and form the reflection members 31.

The reflective materials used for the reflection members 31 in the present embodiment may be Ag (silver) or Al (aluminum) Alternatively, other materials having a reflective function may be used. When materials are selected, the reflectivity may be taken into account and the materials with relatively high reflectivity is preferred.

Figure 5:
FIG. 5 is a structural diagram of a third optical film element according to an embodiment of the present disclosure.

In a specific implementation, as shown in FIG. 5, the optical film element includes a transparent base 1, a first diffusion film 2 provided on the first surface of the transparent base 1, and an optical functional layer 3 provided on a second surface of the transparent base 1 opposite to the first surface, wherein a reflection member 31 is provided in each of the reflection regions Q1 of the optical functional layer 3.

Figure 6:
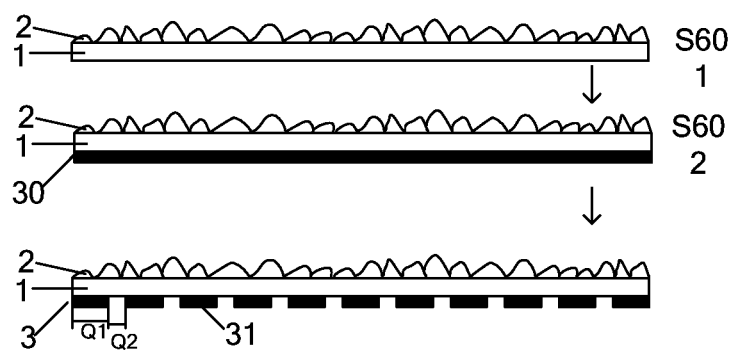
FIG. 6 is a flowchart of a manufacturing method of the third optical film element according to an embodiment of the present disclosure.

Accordingly, as shown in FIG. 6, a manufacturing method of the above optical film element is provided in the present embodiment. The manufacturing method specifically includes the following steps.

In a Step S601, selecting a transparent base 1, and forming a first diffusion film 2 on a first surface of the transparent base 1, wherein the first diffusion film 2 may be specifically formed on the first surface of the transparent base 1 by a coating method, and a surface of the first diffusion film 2 away from the transparent base 1 is of a concave-convex structure. The concave-convex structure has a large height difference which is about 10 μm. The transparent base 1 may be made of plastic such as PET.

In a Step S602, forming an optical functional layer 3 on a second surface of the transparent base 1 opposite to the first surface, wherein a reflection member 31 is provided in each of the reflection regions Q1 of the optical functional layer 3.

Specifically, in the step S602, at first, a reflective materials layer 30 is formed on the second surface of the transparent base 1 using an evaporation process; then, the reflective materials in the transmission regions Q2 is removed using a local etching process (which includes coating photoresist, exposing, developing and etching) so as to form the reflection members 31 corresponding to the reflection regions Q1.

The reflective materials used for the reflection member 31 in the present embodiment may be Ag (silver) or Al (aluminum) Alternatively, other materials having a reflective function may be used. When materials are selected, the reflectivity may be taken into account and the materials with relatively high reflectivity is preferred.

Figure 8:
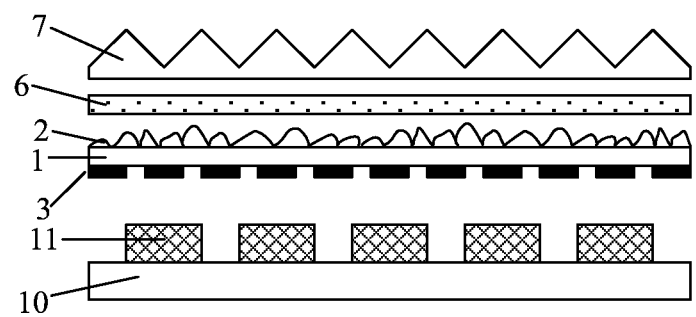
FIG. 8 is a detailed structural diagram of a display device according to an embodiment of the present disclosure.

As shown in FIG. 8, no matter which optical film elements described above are used, the display device according to the present embodiment may further include optical film layers such as a wavelength conversion film 6, a prism film 7, and the like, on the light-exiting side of the optical film element. Taking the light source 11 in the backlight emitting blue light and the wavelength conversion film 6 being a quantum dot film as an example, the blue light emitted from the backlight is homogenized by the optical film element, and then irradiated to the quantum dot film to excite red color quantum dots in the quantum dot film to emit red light, and excite green quantum dots in the quantum dot film to emit green light, and a part of the blue light is transmitted through the quantum dot film. Thus, the red light, the green light and the blue light are mixed to form white light for display of the display panel. Obviously, wavelength conversion film 6 is not limited to the quantum dot film, but can also be a phosphor film.

The present embodiment provides a display device which includes the backlight of the above embodiment. Since the display device of the present embodiment includes the backlight of the above embodiment, the display has uniform brightness.

The display device of the present embodiment may be any product or component having a display function such as a liquid crystal panel, an electronic paper, a mobile phone, a tablet computer, a television, a display, a laptop computer, a digital photo frame, a navigator, and the like.

The present disclosure has the following beneficial effects:

Since the optical film element of the present embodiment is applied to the light-exiting side of the backlight, at least part of the light emitted by the light source will not be emitted out directly, but is reflected by the reflection members in the optical functional layer for the first time, and then is reflected by the substrate for the second time. After multiple reflections as such, almost all of the light emitted by the light source is emitted out from the transmission regions of the optical functional layer, and then irradiated to the first diffusion film to be homogenized. It can be seen that, with the optical film element in the present embodiment, the optical path of the light emitted from the light source can be increased, and a backlight with high color gamut and high dynamic contrast can be obtained. Moreover, in the backlight provided in the present embodiment, the optical path of the light is increased through the reflection by the optical film element, thus the backlight in this embodiment may be thinner than that in the related art.

It will be appreciated that the above implementations are only exemplary implementations for illustrating the principle of the present disclosure. However, the present disclosure is not limited thereto. An ordinary person skilled in the art can make variants and improvements to the present disclosure without departing from the essence of the present disclosure. These variations and improvements are also considered to fall within the scope of the present disclosure.

What is claimed is:

1. An optical film element, comprising a transparent base and a first diffusion film provided on a first surface of the transparent base, the optical film element further comprising an optical functional layer provided on a second surface of the transparent base opposite to the first surface, wherein the optical functional layer comprising a transmission region and a reflection region, and a reflection member is provided in the reflection region, and
wherein a via penetrating through the first diffusion film and the transparent base is provided at a position corresponding to the transmission region.

2. The optical film element of claim 1, further comprising a second diffusion film provided between the optical functional layer and the transparent base.

3. The optical film element of claim 2, wherein a surface of the second diffusion film away from the transparent base is of a concave-convex structure, and the reflection member is provided on the concave-convex structure.

4. The optical film element of claim 3, wherein the concave-convex structure has a height difference of 10 μm.

5. The optical film element of claim 4, wherein the transparent base is made of PET plastic.

6. The optical film element of claim 1, wherein the transmission region has a width ranging from 20 μm to 1000 μm.

7. The optical film element of claim 1, wherein a materials of the reflection structure comprises Ag or Al.

8. A manufacturing method of an optical film element, comprising steps of:
forming a first diffusion film on a first surface of a transparent base; and
forming an optical functional layer on a second surface of the transparent base opposite to the first surface,
wherein the optical functional layer comprises a transmission region and a reflection region, and a reflection member is provided in the reflection region, and wherein the manufacturing method further comprises a step of:
forming a via penetrating the transparent base and the first diffusion film while forming the optical functional layer, wherein the via is provided at a position corresponding to the transmission region.

9. The manufacturing method of an optical film element of claim 8, wherein the step of forming the optical functional layer and the via comprises steps of:
depositing an optical functional materials on the second surface of the transparent base; and
perforating the optical functional materials, the transparent base and the first diffusion film at a position corresponding to the transmission region, to form the optical functional layer and the via.

10. The manufacturing method of an optical film element of claim 8, prior to forming the optical functional layer, further comprising a step of: forming a second diffusion film on the second surface of the transparent base, wherein a surface of the second diffusion film away from the transparent base is of a concave-convex structure.

11. The manufacturing method of an optical film element of claim 10, wherein the step of forming the optical functional layer further comprises a step of:
forming a reflection member on the concave-convex structure using an evaporation process.

12. The manufacturing method of an optical film element of claim 8, wherein the step of forming the optical functional layer at the second surface of the transparent base opposite to the first surface further comprises steps of:
evaporating a reflection materials on the second surface of the transparent base; and
removing a portion of the reflection materials corresponding to the transmission region using a local etching process to form the optical functional layer.

13. A backlight, comprising: a reflective substrate; a light source provided on the reflective substrate, and an optical film element provided at a light-exiting side of the light source, wherein
the optical film element comprises a transparent base, a first diffusion film provided on a first surface of the transparent base, and an optical functional layer provided on a second surface of the transparent base opposite to the first surface, and wherein
the optical functional layer comprises a transmission region and a reflection region, and a reflection member is provided in the reflection region,
the optical functional layer of the optical film element is provided to face the light source, and
wherein a via penetrating through the first diffusion film and the transparent base is provided at a position corresponding to the transmission region.

14. A display device, comprising the backlight of claim 13.

15. The display device of claim 14, further comprising a wavelength conversion film and a prism film provided at a light-exiting side of the optical film element.

16. The display device of claim 15, wherein the wavelength conversion film is a quantum dot film or a phosphor film.

* * * * *